(12) United States Patent
Wilson et al.

(10) Patent No.: US 7,206,972 B2
(45) Date of Patent: Apr. 17, 2007

(54) PATH COMMISSIONING ANALYSIS AND DIAGNOSTIC TOOL

(75) Inventors: Craig Murray Mansell Wilson, Ottawa (CA); Richard Loeffler-Henry, Ottawa (CA); Nicolas Fraiji, Ottawa (CA)

(73) Assignee: Alcatel, Paris (FR)

( * ) Notice: Subject to any disclaimer, the term of this patent is extended or adjusted under 35 U.S.C. 154(b) by 509 days.

(21) Appl. No.: 10/338,719

(22) Filed: Jan. 9, 2003

(65) Prior Publication Data
US 2004/0139371 A1    Jul. 15, 2004

(51) Int. Cl.
*G06F 11/00* (2006.01)

(52) U.S. Cl. .............. 714/43; 714/31; 714/48; 714/57

(58) Field of Classification Search ............. 714/25, 714/27, 43, 44, 48
See application file for complete search history.

(56) References Cited

U.S. PATENT DOCUMENTS

| | | | | |
|---|---|---|---|---|
| 4,228,496 | A * | 10/1980 | Katzman et al. ............ | 710/100 |
| 5,751,932 | A * | 5/1998 | Horst et al. ............... | 714/12 |
| 5,986,783 | A * | 11/1999 | Sharma et al. ............. | 398/59 |
| 6,353,898 | B1 * | 3/2002 | Wipfel et al. .............. | 714/48 |
| 6,628,304 | B2 * | 9/2003 | Mitchell et al. ........... | 715/734 |
| 6,694,455 | B1 * | 2/2004 | Scrandis et al. ........... | 714/31 |
| 6,810,496 | B1 * | 10/2004 | Vittal ...................... | 714/57 |
| 2002/0111755 | A1 * | 8/2002 | Valadarsky et al. ........ | 702/58 |
| 2002/0116669 | A1 * | 8/2002 | Jain ......................... | 714/43 |
| 2003/0126299 | A1 * | 7/2003 | Shah-Heydari ............ | 709/252 |
| 2003/0191830 | A1 * | 10/2003 | Fitzgerald ................. | 709/223 |
| 2004/0120270 | A1 * | 6/2004 | Saxon et al. .............. | 370/258 |
| 2004/0131064 | A1 * | 7/2004 | Burwell et al. ........... | 370/397 |

OTHER PUBLICATIONS http://www.webster.com/cgi-bin/dictionary, Apr. 17, 2006, search term "each".*

* cited by examiner

*Primary Examiner*—Scott Baderman
*Assistant Examiner*—Loan Truong
(74) *Attorney, Agent, or Firm*—Jim Zegeer

(57) ABSTRACT

A method for identifying service critical faults in a communications network and a network management system employing the method are provided. A service provisioning tool associated with the network management system and operating in accordance with the method, performs operations on a multitude of managed entity instances stored in a containment hierarchy associated with the network management system, the managed entity instances corresponding to managed field installed equipment. Received alarm information is used to ascribe operational states to corresponding managed entities in the containment hierarchy. Operating in accordance with the presented method, the service provisioning tool inspects low-level managed entities in the containment hierarchy and, if each managed entity of a group of low-level managed entities which provide a unitary function is "unavailable", then the operational state of a corresponding high-level managed entity is set to the "unavailable" state. Service critical failures are distinctly pointed out from the multitude of reported failures. Benefits are derived from an improved failure reporting enabling fault management to address service critical failures on a priority basis.

3 Claims, 2 Drawing Sheets

Service Provisioning Status View

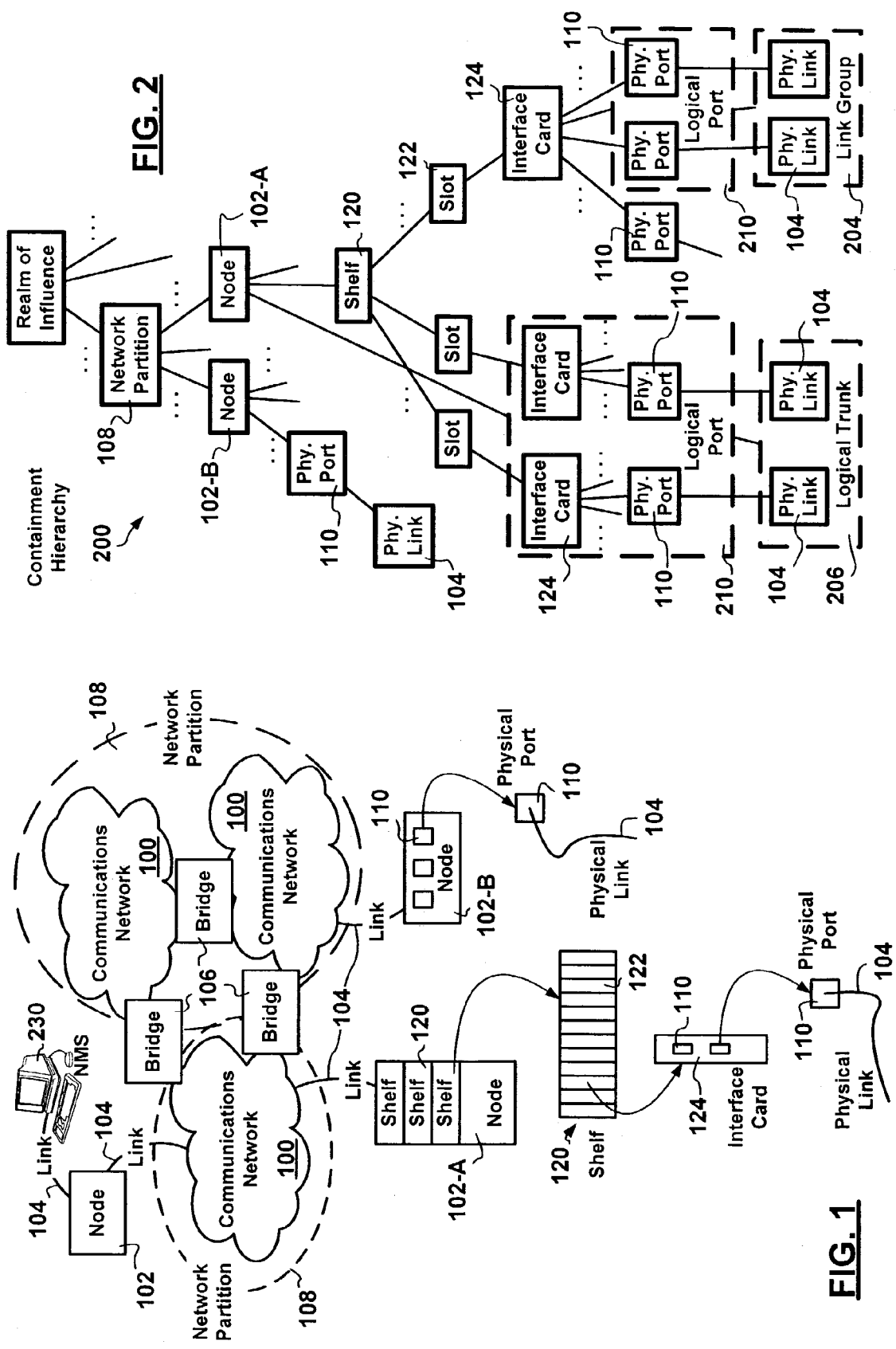

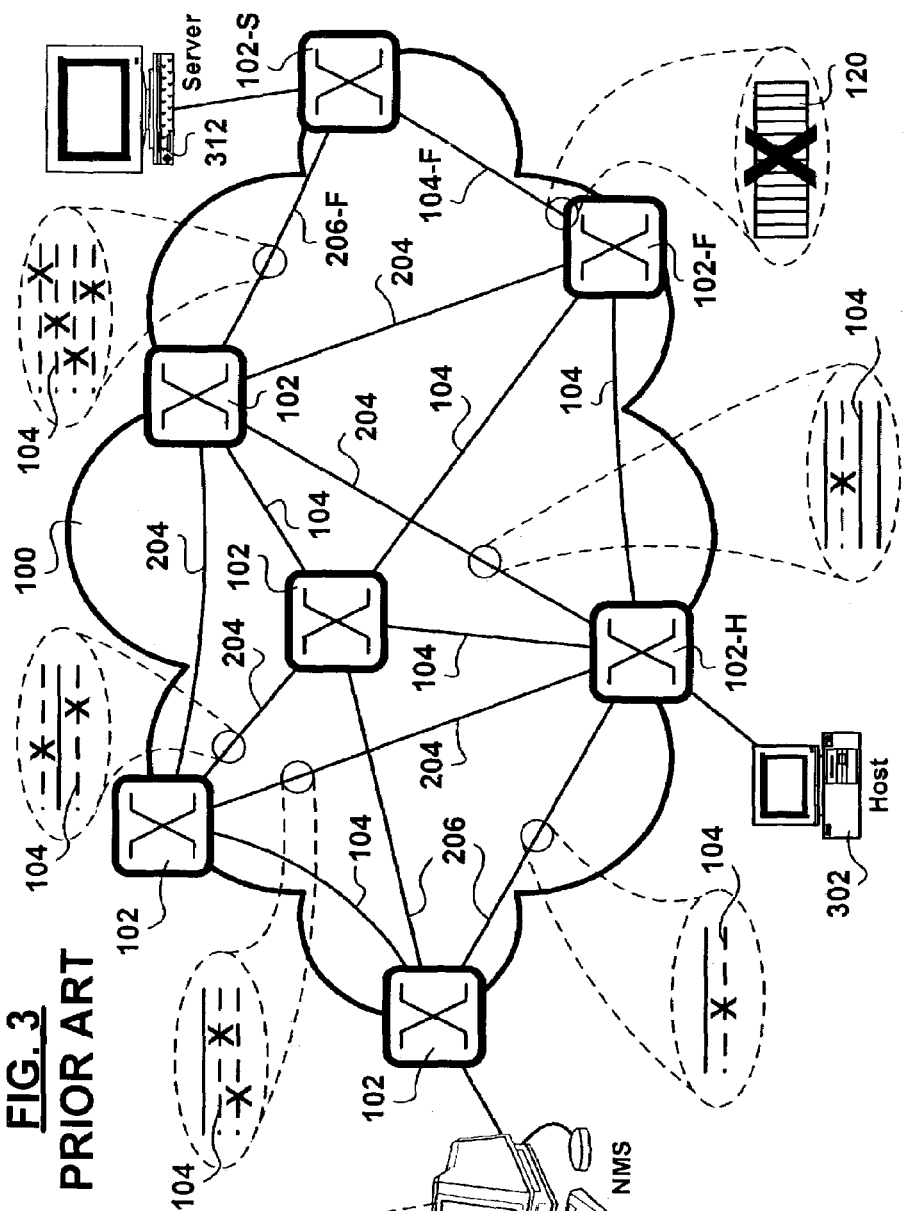
FIG. 3
PRIOR ART
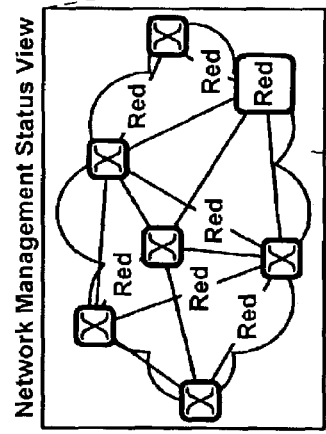
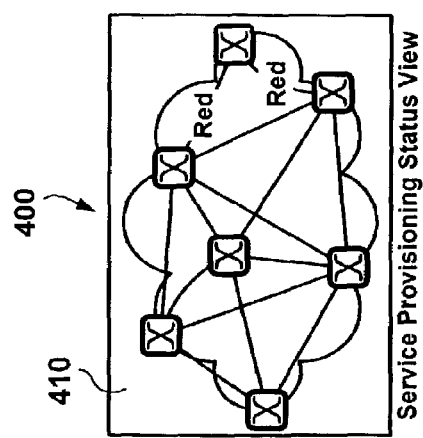
FIG. 4

PATH COMMISSIONING ANALYSIS AND DIAGNOSTIC TOOL

FIELD OF THE INVENTION

The invention relates to communications service provisioning, and in particular to methods and apparatus for analyzing and diagnosing path commissioning.

BACKGROUND OF THE INVENTION

Communications services are provided over a managed infrastructure of managed communications network nodes and interconnecting links.

FIG. 1 is a schematic diagram showing interconnected network elements implementing connected communications networks.

Network nodes 102, 102-A, 102-B are physically interconnected via physical links 104 in communications networks 100. Communications networks 100 may be bridged via bridge network nodes 106 to enable data content exchange therebetween. Connected communications networks 100 can be grouped defining areas of focus and influence for the purposes of network management, known as network partitions 108.

All data network equipment is subject to design choices which are bound to differ from vendor to vendor. For example, as shown schematically in FIG. 1, an equipment vendor may chose to implement an integral network node device 102-B having a switching processor and a group of ports 110. Another equipment vendor may chose a customizable implementation of a network node 102-A including: a switching fabric, an equipment rack divided into shelves, each shelf 120 having slot connectors 122 for connection with interface cards, each interface card 124 having at least one port 110. The two network nodes 102-A and 102-B provide the same switching function. The network node 102-A is better adapted to provide high throughput.

A exemplary containment hierarchy 200 of managed network entities, shown in FIG. 2, is maintained for network management purposes. Each managed network entity instance in the containment hierarchy 200 corresponds to an installed physical managed entity or a defined logical managed entity in the realm of influence. Exemplary physical managed entities include, but are not limited to: physical links 104, physical ports 110, interface cards 124, shelves 120, network nodes 102, etc. Exemplary logical managed entities include, but are not limited to: network partitions 108, link groups 204, logical trunks 206, logical ports 210, etc.

Typically link groups 204 are used to provide inverse multiplexing. A link group 204 is typically defined to include a group of physical links 104 used in combination to convey content at the aggregate bandwidth of the group of physical links 104. The group of physical links 104 in the link group 204 connect to a corresponding group of ports 110 associated typically with an interface card 124 providing inverse multiplexing functionality. The corresponding group of physical ports 110 define a logical port 210. In conveying content, a data flow may be routed onto a link group 204, the inverse multiplexing interface card 124 distributing the data flow bandwidth over the individual physical links 104 in the link group 204. From a service provisioning perspective, each physical link 104 in the link group 204 represents a potential hop in a route for a prospective connection path independent of all other physical links 104 in the link group 204.

Typically logical trunks 206 are used to provide redundant content transport. Each logical trunk 206 is typically defined to include at least one designated active physical link 104, actively used for conveying content, and at least one designated standby physical link 104, reserved to convey content in the event that the associated active physical link 104 experiences a failure. Typically the physical links 104 in a logical trunk 206 connect to physical ports 110 on different interface cards 124 to provide redundancy. The corresponding group of physical ports 110 define a logical port 210. In conveying content, a data flow may be switched to the logical port 210, the combination of interface cards 124 cooperating to direct content transport over the active physical link 104 or the standby physical link 104 dependent on the operational status of the designated active equipment (physical link 104, corresponding physical port 110, corresponding interface card 124, etc.)

Network management is concerned, at least in part, with monitoring managed communications network equipment to ensure adherence to a defined communications network state. Reported alarms provide information regarding departures from the defined communications network state. And, fault management includes attending to alarms in an attempt to restore the managed communications network to the defined network state.

The definition of the communications network state includes configuring operational parameters associated with managed communications network equipment to operate in a desired fashion. A Network Management System (NMS) 230 is used to interact with the field installed communications network equipment either directly or indirectly via interaction with communication network entity instances in the containment hierarchy 200. Alarm information is reported to the NMS 230 and status registers associated with the corresponding communications network managed entity instances in the containment hierarchy 200 are updated accordingly.

A network management system such as an Alcatel 5620 NMS implements a network management tool 300 for interacting with the containment hierarchy 200 to provide an operator typically with a visual display of the managed communications network state.

A person familiar with network management understands that the amount of configuration, status, and alarm information maintained via the containment hierarchy 200 is so great that it cannot possibly all be displayed on an NMS console, not even for what today is considered a simple communications network 100. The network management tool 300 extracts: managed entity instance identifiers, associations between managed entity instances, and managed entity states from the containment hierarchy 200. The network management tool 300 filters the managed entity identifiers and the associations between the managed entity instances to display a summary high-level view of interconnected managed communications network entities referred to as a network map 310. Typically the network map 310 displays high-level managed entities such as network node and interconnecting links. The network management tool 300 processes the extracted alarm information to derive summary operational states for the displayed managed communications network entities. The derived summary operational states are also displayed in the network map 310. On a continuing basis, the network management tool 300 scans the containment hierarchy 200 and/or is provided with managed entity status change information to update the network status displayed via the network map 310.

The portions of the network map 310 displayed, may be viewed at different levels of complexity by interacting therewith. High-level views of the network map 310 combine groups of associated managed communication network entities under single iconical representations thereof. For example, physical links 104 associated with either logical link groups 204 or logical trunks 206 are not shown, but rather the logical link group 204 and/or the logical trunks 206 are iconically shown as interconnecting links. Ports 110, logical ports 210, interface cards 124 and shelves 120 are not shown, while communication network nodes 102 are shown as icons. Summary alarm information is typically concurrently displayed via predefined characteristics, typically color, ascribed to the iconical representations.

For purposes of effecting network management, it is imperative that all alarm status information received is used to update the current network state and that departures from the desired operation are displayed in the network map 310 as exemplarily shown in FIG. 3. Low-level alarm information reported by managed field installed equipment is propagated to high-level managed entity instances along the managed entity associations specified in the containment hierarchy 200, and displayed via the corresponding high-level iconical representations thereof in the summary network map 310 view. For greater certainty, the most severe state is always propagated to the displayed high-level managed entities to enable troubleshooting of failed infrastructure. Therefore the high level network map 310 displayed enables macro-management of the managed infrastructure in the realm of management.

It is instructive to note that alarm information may not necessarily be reported by the failed equipment itself, although the possibility is not excluded, as the failed equipment may not be operational to the extent to which alarm information reporting is possible. Typically, managed entities associated with the failed equipment report alarm information. It is further understood that a failure experienced by a single managed entities may cause managed entities associated therewith to also experience failure. For example, an interface card 124 having a port 110 experiencing a failure, may still be operational to the extent that the interface card 124 is able to report the failure in generating alarm information, while the physical link 104 associated with the failed port 110 also experiences a failure by virtue of not being able to convey content to the failed port 110. Managed equipment associated with the other end of the affected physical link 104 will also report that the affected physical link 104 is experiencing a failure.

In accordance with a typical service provisioning scenario shown in FIG. 3, a user operating a host network node 302 seeks services provided via a server 312. Both the host network node 302 and the server 312 employ content transport services of the communications network 100. The host network node 302 is connected to network node 102-H and the server 312 is connected to the network node 102-S. The network map 310, presented in FIG. 3, shows seven instances of infrastructure failures in the communications network 100.

To reveal the managed entities experiencing a failures, and from which the alarm information was inherited, an analyst uses the NMS 230, typically by interacting with the network map 310, to navigate the containment hierarchy 200 to expose underlying managed network infrastructure to a greater and greater detail. Inspecting low-level managed network entity records enables micro-management thereof.

The network state shown in FIG. 3 displays high-level affected managed equipment via an exemplary network management color-based failure reporting scheme. In particular the color "red" is used to indicate of equipment failures whereas "green", for example, would indicate that the managed equipment is performing in accordance with the current configuration of respective operational parameters. Other failure severity reporting schemes may be employed including the use of audible signals.

In employing the network management failure reporting scheme, if just one physical link 104 in a link group 204 is "unavailable" or if one of the active and standby links 104 in a logical trunk 206 is "unavailable", the corresponding high-level link group 204 or logical trunk 206 managed entity in the containment hierarchy 200 inherits the "unavailable" status and the high-level entities are shown in the network map 310 in red. The network management failure reporting scheme certainly applies to failures experienced by all managed entities and therefore network nodes 102 may be shown in red if sub-components such as, but not limited to: a shelf 120 or the corresponding switching fabric, are experiencing failures (loss of power for example). Therefore all alarms are treated the same and propagated to the high-level network status view 310.

In particular three high-level interconnecting links associated with network node 102-H are shown in red in FIG. 3. By interacting with the high-level interconnecting link iconical representations thereof, details of the corresponding low-level infrastructure is revealed. Individual physical links 104 from which the "unavailable" status was inherited are shown in exploded views.

In accordance with the network management failure reporting scheme, the alarm information received is not qualified to further address service provisioning aspects. The proviso being that, if the network management function provides a fully operational network infrastructure, then the service provisioning function can always succeed in establishing connections—further assuming available bandwidth. Although network infrastructure failures including: high bit error rates, large numbers of data segments being dropped/lost, scheduled maintenance, etc. may affect the quality of service provided, none of these have a terminal impact on service provisioning.

Certainly as long as a single physical link 104 in a link group 204 or a logical trunk 206 can convey content, connections can be established if there is available bandwidth. The three high-level links associated with the network node 102-H and shown in red, do have at least one operational physical link 104 as part of the respective link groups 204 and the logical trunk 206.

As the propagation of the alarm information to high-level managed entities marks the high-level managed entities as "unavailable", and if the network state displayed 310 is used to direct connection establishment in service provisioning, a significant portion of the high level managed infrastructure may be marked as "unavailable" when in fact only sub-components thereof are affected by the corresponding experienced failures. Consequently, connection route trace diagnostics tools used for troubleshooting connections, in processing information stored in the containment hierarchy 200, find the high-level managed entities "unavailable" and therefore report "unavailable resources" errors.

All alarms reported can be addressed by the network management function, and certainly if all failures were attended to, then service provisioning would not encounter "unavailable resources" conditions. However, the complexity of present day communications networks 100 has increased to such an extent, that attending to all reported alarms is such an involved procedure that the ensuing service provisioning downtime may be overly long.

There is a need to assess network infrastructure failure severity from the point of view of service provisioning.

SUMMARY OF THE INVENTION

In accordance with an aspect of the invention, a method of identifying service critical faults in a communications network is provided. The method includes receiving alarm information from field installed communications network equipment. Operational states of managed entity instances held in a containment hierarchy corresponding to the failed network infrastructure are updated to reflect the unavailability thereof. Operational state information associated with a group of low-level managed entity instances is propagated to high-level managed entity instances, if a combination of low-level managed entity instances in a group of low-level managed entity instances prevents connection establishment therethrough. And, identifying the high-level managed entity instances experiencing service critical failures.

In accordance with another aspect of the invention, a network management system is provided. The network management system includes a containment hierarchy tracking a multitude of managed entity instances, and a service provisioning tool operating on the multitude of managed entity instances. The service provisioning tool propagates operational state information from a group of low-level managed entity instances to a corresponding high-level managed entity, the high-level managed entity operational state being set to correspond to a network infrastructure failure if the combination of low-level managed entity instances in the group of low-level managed entity instances prevents connection establishment therethrough.

The advantages are derived from an efficient means of diagnosing connection establishment problems in communications networks.

BRIEF DESCRIPTION OF THE DRAWINGS

The features and advantages of the invention will become more apparent from the following detailed description of the preferred embodiments with reference to the attached diagrams wherein:

FIG. 1 is a schematic diagram showing exemplary interconnected communication network equipment;

FIG. 2 is a schematic diagram showing an exemplary containment hierarchy enabling centralized network management of managed network entities;

FIG. 3 is a schematic diagram showing the operation of a prior art network management tool for inspecting a communications network status; and FIG. 4 is a schematic diagram showing, in accordance with an exemplary embodiment of the invention, a path analysis and diagnosis tool providing service provisioning support.

It will be noted that in the attached diagrams like features bear similar labels.

DETAILED DESCRIPTION OF THE EMBODIMENTS

There is a strong demand for using network maps, akin to network maps 310 employed for network management purposes, in service monitoring and service provisioning. An operator needs to be informed of failed managed network equipment which blocks connection establishment.

As mentioned above the use of network management maps 310 is inadequate for service provisioning due to the fact that not all reported failures reported affect service provisioning. By displaying high-level managed entities as "unavailable" in accordance with network management failure reporting scheme, wherein the most severe alarm reported by sub-component managed entities is inherited by high-level managed entities, the managed equipment experiencing a failure is obscured preventing the assessment of the failure from the point of view of service provisioning.

Alarm information is not important, as far as service provisioning is concerned, unless the experienced failures are so extensive that no services may be provided. In particular, a determination of the extent to which a failure affects service provisioning is needed to discover reported alarms which represent service critical faults. The results of the determination then must be provided to the network management function as an indication as to what to attend to on a priority basis in order to enable directed fault management to restore service provisioning.

From a service provisioning point of view, infrastructure failures may therefore be categorized into: non-service critical faults, and service critical faults. Non-service critical faults include: general faults which do not affect service provisioning, service affecting faults which may degrade the quality of service provided while not preventing service provisioning. Service critical faults prevent service provisioning typically leading to an inability to establish connections.

Particularly in referring to FIG. 3, out of the seven failures reported via the network management failure reporting scheme, six are unique, and only two infrastructure failures are service critical faults and represent the reason why a connection cannot be established between the host network node 302 and the server node 312. The two service critical faults include failed infrastructure associated with the logical trunk 206-F and physical link 104-F both of which block content transport to the network node 102-S. During an inspection, it would be revealed that all physical links 104 associated with the logical trunk 206-F are "unavailable", and that a shelf 120 of the network node 102-F associated with the physical link 104-F is "unavailable" (for example the shelf 120 has lost power). These two particular reported infrastructure failures cannot be singled out from the other reported infrastructure failures in employing the network management fault reporting scheme, which therefore has the effect of masking the exact location of service critical faults.

In accordance with the exemplary embodiment of the invention, a service provisioning failure reporting scheme is used for the purposes of providing a service provisioning status of a network displayed in a network map.

Referring to FIG. 4, a service provisioning tool 400, implementing the exemplary service provisioning failure reporting scheme, inspects the containment hierarchy 200 to extract therefrom: managed entity instance identifiers, associations between managed entity instances, and managed entity states. The service provisioning tool 400 filters the managed entity identifiers and the associations between the managed entity instances to display a summary high-level view of interconnected managed communications network entities in a network map 410. The service provisioning tool 400 processes the extracted alarm information to derive summary service provisioning states for the displayed managed communications network entities. The derived summary service provisioning states are also displayed in the network map 410. On a continuing basis, the service provisioning tool 400 scans the containment hierarchy 200 and/or is provided with managed entity status change information to update the service provisioning status displayed via the network map 410.

In accordance with the exemplary embodiment of the invention, the service provisioning failure reporting scheme stipulates that only if all sub-components of a managed entity are "unavailable", then the managed entity is to inherit the "unavailable" status. The presented service provisioning failure reporting scheme therefore propagates the least severe status to the high-level managed entities displayed in the network map 410 providing for the identification of the location of service critical fault location.

Referring to FIG. 4, the locations of the service critical faults are very apparent. While there are many failures throughout the network, as evidenced in FIG. 3, only the physical link 104-F and the logical trunk 206-F which cannot be used to convey content are shown in red.

The network map 410 provides an analyst with an assurance that it would be possible to setup a connection over network infrastructure corresponding to "green" iconical elements, if one was to be requested—subject to available bandwidth. Furthermore, the network map 410 identifies service critical failed network infrastructure which, if used, will not provide service content transport and/or processing. The service critical failures may be provided to the network management function to direct and prioritize fault management.

In accordance with an exemplary use of the invention, a communications path route tracing tool is used in service provisioning to troubleshoot connection establishment. The connection path route tracing information provided by the connection path route tracing tool may also be used to ascribe qualifiers to managed entities encountered as a route is traced. A route path tracing reporting scheme may also be employed to propagate the qualifiers to the high-level managed entities displayed in the network map 410. The route tracing reporting scheme may also cause the high-level managed entities displayed to be labeled, for example with color. Exemplary managed entity qualifiers label the managed entities encountered in the traced route path in:

Black—"considered" in a path route search;
Red—"considered and rejected";
Yellow—"waiting for repairs";
Green—"available for use";
Orange—"may cause path to go interrupted";
Blue—"selected for connection establishment"; and
Purple—"alternate".

Coordination is necessary in using the route tracing reporting scheme and the service provisioning failure reporting scheme in combination to ensure that a clash between the colors does not exist. For example, the service provisioning failure reporting scheme may fill the iconical managed entity representations with a color while the route tracing reporting scheme may outline the iconical managed entity representations in a particular color.

With a network map 410 depicting a multitude of service critical faults, fault management may further be directed to address a particular inability to establish a particular connection by combining connection route path tracing information provided by the connection route path tracing tool with the service critical faults displayed by the service provisioning tool 400.

The embodiments presented are exemplary only and persons skilled in the art would appreciate that variations to the above described embodiments may be made without departing from the spirit of the invention. The scope of the invention is solely defined by the appended claims.

We claim:

1. A method of identifying service critical faults in a communications network comprising:
   a. receiving alarm information from field installed communications network equipment;
   b. updating operational states of managed entity instances corresponding to the failed network infrastructure to reflect the unavailability thereof;
   c. propagating operational state information associated with a group of low-level managed entity instances to at least one high-level managed entity instance; and
   d. identifying high-level managed entity instances experiencing service critical failures;
   e. receiving route path tracing information generated in troubleshooting connection establishment;
   f. updating route path tracing states of the managed entity instances corresponding to network infrastructure encountered in a traced route path to reflect route path trace states thereof;
   g. propagating route path tracing state information associated with a low-level managed entity instance to at least one high-level managed entity instances; and
   h. identifying high-level managed entity instances experiencing critical route path tracing failures;
   i. displaying iconical representations of the identified high-level managed entities experiencing critical route path tracing failures,
   wherein propagating operational state information from the group of low-level managed entity instances to the at least one high-level managed entity, the high-level managed entity operational state being set to correspond to a failure if each low-level managed entity instance in the group of low-level managed entity instances is experiencing a failure, and
   wherein displaying iconical representations of the identified high-level managed entities experiencing critical route path tracing failures, the method further comprises a step of: employing a route path tracing failure reporting scheme;
   wherein employing the route path tracing failure reporting scheme, the method further comprises a step of: ascribing a route path tracing state from: "in path", "in alternate path", "interrupted", "available", "needs repair", "rejected", and "not considered".

2. A network management system comprising:
   a. a plurality managed entity instances corresponding to managed field installed network infrastructure;
   b. a service provisioning tool operating on the plurality of managed entity instances, the service provisioning tool propagating operational state information from a group of low-level managed entity instances to a high-level managed entity, the high-level managed entity operational state being set to correspond to a failure if each low-level managed entity instance in the group of low-level managed entity instances prevents connection establishment therethrough, the inheritance of operational state identifying managed entities experiencing service critical failures, and
   c. a connection route path tracing tool operating on the plurality of managed entity instances, the route path tracing tool propagating route path tracing state information from a low-level managed entity instance to a high-level managed entity, the inheritance of route path tracing state identifying managed entities experiencing critical route path tracing failures, the combination of managed entities identified as experiencing service critical faults and managed entities identified as experiencing critical route path tracing failures directing a fault management function to address service critical faults preventing connection establishment, wherein a route path tracing state ascribed to managed entity is one from: "in path", "in alternate path", "interrupted", "available", "needs repair", "rejected", and "not considered".

3. A method of identifying service critical faults in a communications network by propagating operational state information from a group of low-level managed entity instances to at least one high-level managed entity, the high-level managed entity being set to indicate a failure only if all low-level managed entity instances in the group of low-level managed entity instances are experiencing a failure.

* * * * *